(12) United States Patent
Xing et al.

(10) Patent No.: US 9,047,212 B2
(45) Date of Patent: Jun. 2, 2015

(54) ERROR ESTIMATION MODULE AND ESTIMATION METHOD THEREOF FOR FLASH MEMORY

(75) Inventors: Jipeng Xing, Hubei (CN); Wenjie Huo, Hubei (CN); Jie Zhang, Hubei (CN)

(73) Assignee: MEMORIGHT (WUHAN) CO., LTD., Wuhan, Hubei (CN)

( * ) Notice: Subject to any disclaimer, the term of this patent is extended or adjusted under 35 U.S.C. 154(b) by 9 days.

(21) Appl. No.: 14/119,121

(22) PCT Filed: Mar. 23, 2012

(86) PCT No.: PCT/CN2012/072955
§ 371 (c)(1),
(2), (4) Date: Nov. 20, 2013

(87) PCT Pub. No.: WO2012/159490
PCT Pub. Date: Nov. 29, 2012

(65) Prior Publication Data
US 2014/0089765 A1 Mar. 27, 2014

(30) Foreign Application Priority Data

May 26, 2011 (CN) .......................... 2011 1 0138166

(51) Int. Cl.
*G11C 29/00* (2006.01)
*G06F 11/10* (2006.01)
(52) U.S. Cl.
CPC ................................. *G06F 11/1068* (2013.01)
(58) Field of Classification Search
CPC ............ G06F 11/1068; G06F 11/1044; G06F 11/1076; G06F 12/00; G06F 11/1072; G06F 3/0619; G06F 3/0616; G06F 3/0644; G06F 3/0659; G06F 3/0679; G06F 12/0246; G11C 11/5621; G11C 11/5692; G11C 29/00; G11C 29/72; H03M 13/05
See application file for complete search history.

(56) References Cited

U.S. PATENT DOCUMENTS

2010/0199149 A1* 8/2010 Weingarten et al. .......... 714/773
2012/0304039 A1* 11/2012 Peterson et al. .............. 714/773

OTHER PUBLICATIONS

Yahampath, P., Hjorungnes, A.—Symbol Error Rate Analysis of Spatially Correlated Keyhole MIMO Channels with Space-Time Block Coding and Linear Precoding—Nov. 2007, IEEE—pp. 1-5.*

* cited by examiner

*Primary Examiner* — Guerrier Merant
(74) *Attorney, Agent, or Firm* — Houtteman Law LLC

(57) ABSTRACT

The present invention relates to the field of data storage, and more particularly to an estimation technology in an error correction process of a flash memory. The present invention provides an error estimation module and an error estimation method thereof for a flash memory. The estimation module mainly includes a timer, a quantification index table, a storage page table, and an error index table. The error estimation method of a flash memory includes: creating rewriting and programming error a priori data, and estimating an error rate of the flash memory by using special physical signals in a flash memory device to provide proper error estimation for an error correction algorithm of the flash memory. The present invention is applicable to a solid-state hard disk controller, a flash memory controller, and the like, where the flash memory device is used as a storage medium, so that the reliability of the flash memory device is improved.

2 Claims, 5 Drawing Sheets

ERROR ESTIMATION MODULE AND ESTIMATION METHOD THEREOF FOR FLASH MEMORY

BACKGROUND

1. Technical Field

The present invention relates to the field of data storage, and more particularly to an estimation technology in an error correction process of a flash memory.

2. Related Art

A storage unit in a flash memory device records logic information in the manner of injecting electrons in a floating gate, and at the same time the storage unit further determines logic saved in the floating gate through reading a threshold voltage. When having been rewritten many times, the device characteristics of the flash memory device attenuate, which shortens a programming time of the flash memory while extends an erasing time.

During the operation of a flash memory device, various parasitic effects occur at the same time, resulting in an error on data saved in the flash memory device. The most common error causes are: a programming disturbance, a read disturbance, a pass-through disturbance, and a floating gate coupling effect. During a programming operation of the flash memory device, a flash memory controller raises the voltage on a word line, which causes that an unexpected write action occurs in an adjacent storage unit on the word line, that is, a programming disturbance. In a bit line direction, a high pass-through voltage needs to be applied on storage units on one same bit line, so that to turn on the storage units on the flash memory. Repeated write operations result in unexpected write actions in the units on the bit line, that is, a pass-through disturbance. When the flash memory device undergoes many times of read operations, a flash memory array is turned on repeatedly, and electrons accumulate on trenches of storage units of the flash memory. When the accumulated electrons reach a write threshold value of the storage unit of the flash memory, an unexpected write operation occurs in the storage unit of the flash memory. Here, the disturbances affect the correctness of data saved in a solid-state hard disk, and severe disturbances further shorten the service life of the flash memory device. Also, the floating gate coupling effect also causes severe errors. As the flash memory process keeps developing, the density of devices keeps increasing, causing that a change of a threshold voltage on a floating gate of a single storage unit affects an adjacent unit, which results in an unexpected level shift and an error occurs. A voltage change of a floating gate of a storage unit in a flash memory array causes disturbances to floating gates of neighboring storage units, resulting in unexpected flipping of data saved in the neighboring storage units.

The disturbances and coupling effect in the flash memory device severely affects data saved in the flash memory. During practical use, an error correction algorithm is required to protect data saved in the flash memory. However, before a flash memory controller starts error correction by using advanced check code technologies such as a low-density check code, an error in a channel needs to be properly estimated. Therefore, the flash memory controller requires an error estimation technology for the flash memory.

SUMMARY

The technical problem to be solved by the present invention is to provide an error estimation module and an estimation method thereof for a flash memory, so as to provide a reliable calculation reference for an error correction algorithm for the flash memory, and enhance error correction performance of the system.

To solve the foregoing technical problem, the present invention first provides an error estimation module for a flash memory. The estimation module mainly includes a timer, a quantification index table, a storage page table, and an error index table, where the timer is used to record a programming time or an erasing time of the flash memory, where the programming time or the erasing time collected by the timer serves as an input as a quantification index;

the quantification index table is used to record a mapping between a programming level and a programming time and a mapping between an erasing level and an erasing time, where the erasing level represents a life state of a flash memory block corresponding to a physical address, and the programming level represents a life state of a page inside the flash memory block;

the storage page table includes several continuous storage units, where each continuous storage unit is used to record an erasing level and a programming level of one flash memory block, the erasing level of the flash memory block is saved at the beginning of the continuous storage unit, and the programming levels of pages inside the flash memory block are sequentially saved inside the continuous storage unit;

the error index table contains a block error index table and a page error index table, where the block error index table records a mapping between an erasing level and a corresponding block error rate, and the page error index table records a mapping between a programming level and a corresponding page error rate; and the error estimation module for a flash memory receives timing information and an enable signal sent by a flash memory controller or an R/B signal sent by a flash memory chip as an input, and outputs an error estimation value to an error check module.

On the basis of the foregoing error estimation module for a flash memory, the present invention further provides an error estimation method for a flash memory of the error estimation module for a flash memory, which includes the following specific steps:

performing a stress test of erasing and programming operations on a flash memory device, recording experience data of time changes of erasing and programming and errors of the flash memory device; and creating a quantification index table and an error index table as a priori reference tables for error estimation of an estimation module;

collecting, by a timer of the estimation module, an erasing time of a current flash memory operation block; and during programming of the flash memory, collecting a programming time of a current flash memory operation page;

quantifying, by the estimation module, the erasing time into an erasing level through querying the quantification index table, and quantifying the programming time into a programming level;

saving the current erasing level and programming level and a physical address corresponding to the levels in a storage page table; and requesting the estimation module to perform error estimation on a physical address being operated when a flash memory controller performs an operation on the flash memory; reading, by the estimation module, a programming level and an erasing level corresponding to the physical address from the storage page table, and converting the programming level and the erasing level into an estimated error number for a corresponding page through the error index table, thereby completing an estimation operation.

The present invention estimates an error rate of the flash memory by using special physical signals in a flash memory device, so as to provide proper error estimation for an error correction algorithm of the flash memory, and is applicable to a solid-state hard disk controller, a flash memory controller, and the like, where the flash memory device is used as a storage medium, so that the reliability of a flash memory device is significantly improved.

BRIEF DESCRIPTION OF THE DRAWINGS

The present disclosure will become more fully understood from the detailed description given herein below for illustration only, and thus are not limitative of the present disclosure, and wherein.

In the following, the technical solutions of the present invention are further illustrated in detail with reference to the accompanying drawings and specific implementations.

DETAILED DESCRIPTION

The most basic operation unit in a flash memory device is a page. A flash memory controller can perform a programming or read operation on a page. A plurality of pages forms one block inside the flash memory device. The smallest unit for an erasing operation is a block in the flash memory device. When an erasing operation is performed on a block in the flash memory device, the flash memory controller records the time taken for the erasing operation. When a programming operation is performed on a page in the flash memory, the flash memory controller further monitors the programming time of the flash memory device.

Figure 1:
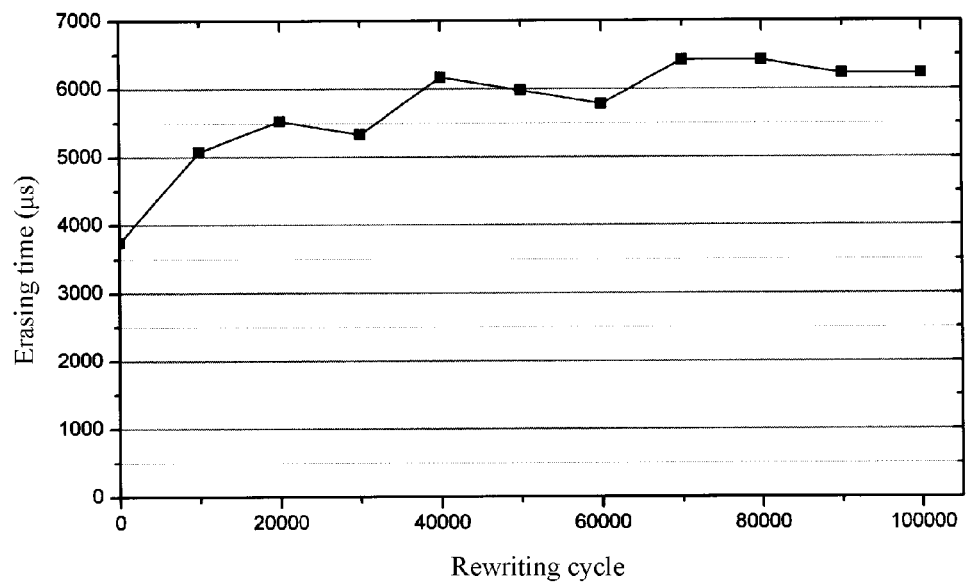
FIG. 1 shows a change rule of a programming time of a flash memory device.
Figure 2:
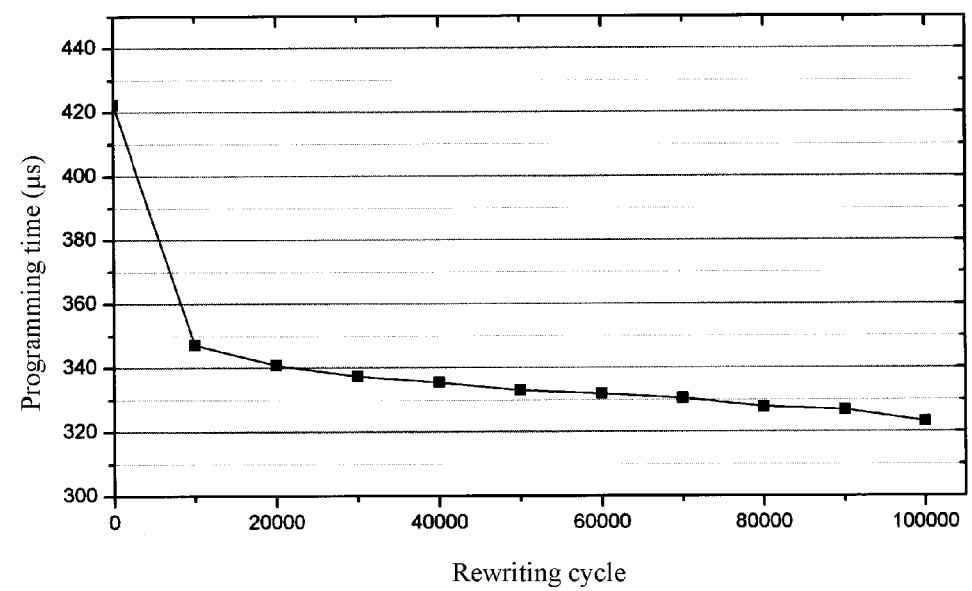
FIG. 2 shows a change rule of an erasing time of a flash memory device.

A correlation exists between an erasing time and a programming time of a flash memory and the operation times of a device. As the rewriting times of the flash memory increase, the erasing time gradually increases, as shown in FIG. 1, and the programming time gradually decreases, as shown in FIG. 2. The cause to such a phenomenon is that: rewriting operations attenuate physical characteristics of the flash memory, which increases the threshold voltage of the device. The increased threshold voltage makes a programming operation easier but a rewriting operation more difficult during the operation of the flash memory. The erasing time and the programming time of a flash memory block truthfully reflects the overall usage of the flash memory block. The increased threshold voltage also means more obvious physical parasitic effects of the device, which increase errors of the flash memory. Therefore, errors in the flash memory can be estimated by monitoring an erasing time and a programming time.

Before estimation adopting an erasing time and programming time in a flash memory controller, the change trends of the erasing time and the programming time of the flash memory device, and a correlation between the erasing time and the programming time and errors of the flash memory, need to be known in advance. The correlation can be obtained through a stress test on the flash memory device. In the stress test, erasing and programming operations are performed continuously on the flash memory device, the time change condition of erasing and programming and the error condition of the flash memory device are recorded. Through the collection, organization, and analysis of experience data, a change table of erasing and programming time, a mapping table between a programming time and an error rate, and a mapping table between an erasing time and an error rate, are created to serve as a priori reference data for estimation operation of the estimation module.

Figure 3:
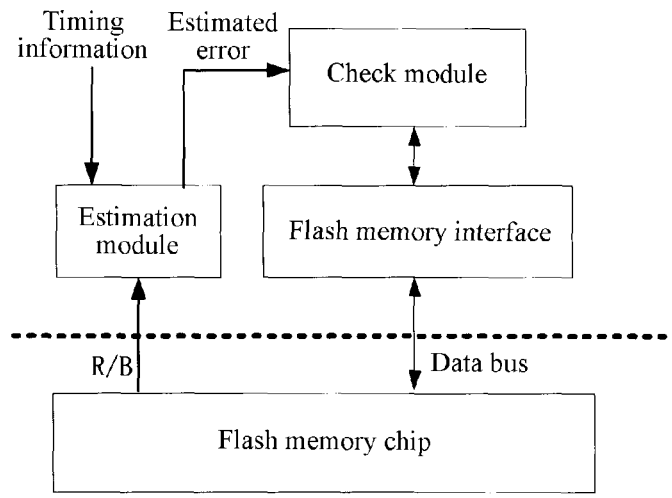
FIG. 3 is a schematic view of an estimation module interface.

FIG. 3 is a schematic view of an estimation module interface. An estimation module is inserted in a flash memory controller, and sends obtained estimation information to a check module in the flash memory controller. A flash memory chip and the flash memory controller exchange data through a data bus, and a flash memory interface module of the flash memory controller takes control. In the interface of the flash memory chip, a group of R/B signals are used to indicate a work state of the flash memory. During a programming and erasing operation of the flash memory, the level of the R/B signal enters an effective state, indicating that the flash memory is currently in a busy state and do not respond to a new operation. When the operation ends, the R/B signal enters an ineffective state again, indicating that the flash memory enters an idle state. When the flash memory controller performs an operation on the flash memory device, the estimation module performs timing on the effective time of the R/B signal in the flash memory device, so as to obtain the time overhead taken for the programming or erasing operation of the flash memory, so as to help the estimation module to estimate errors for the flash memory device. An error estimated by the estimation module is sent to a check module, and the check module performs an error check on the programming or erasing operation of the flash memory.

In addition to the method of direct timing by adopting an R/B signal, the estimation module may further complete timing in the manner of coordinating with the flash memory controller. During an erasing or programming operation of the flash memory, the flash memory controller can send a "reading state" command to the flash memory continuously to learn the work state of the flash memory. The flash memory controller counts the time overhead taken by the flash memory for the erasing or programming operation by examining changes of the work state before and after the flash memory finishes the operation, and sends the obtained timing information to the estimation module to help the estimation module to complete the timing work.

Figure 4:
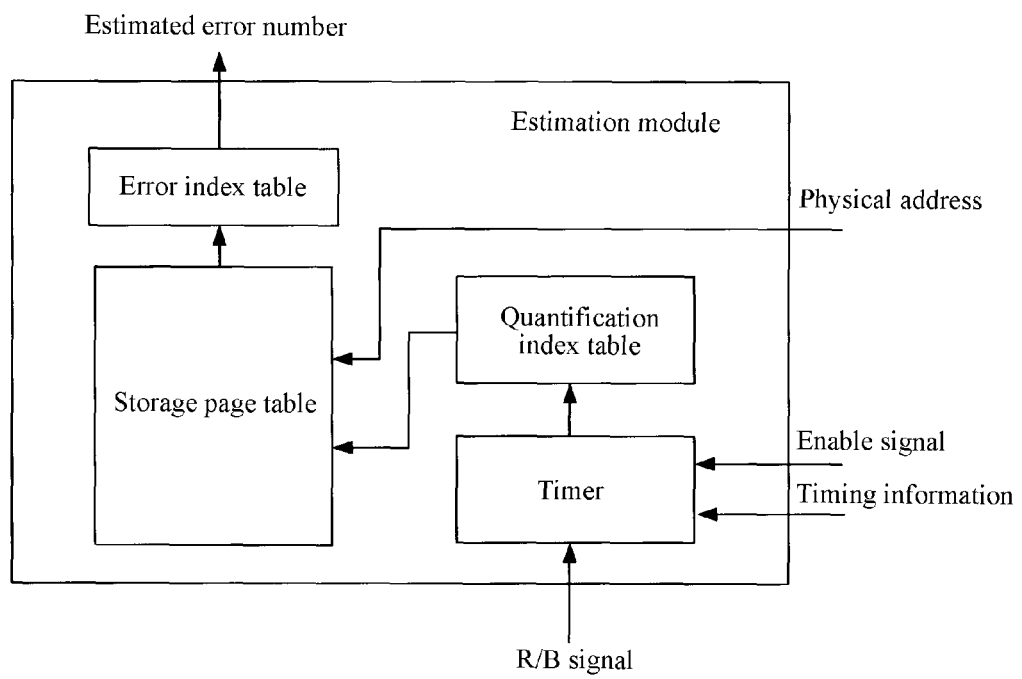
FIG. 4 is a structural view of the inside of an estimation module.

The estimation module mainly includes a timer, a quantification index table, a storage page table, and an error index table, the structure of which is shown in FIG. 4. When the controller performs an operation on the flash memory, the controller inputs an enable signal to activate the timer in the estimation module to start to record the effective work time of the flash memory. The recorded programming time or erasing time are quantified into a programming level or an erasing level in a quantification index table, which are saved in a storage page table according to a physical address. To perform an error correction operation, the controller reads a programming level and an erasing level corresponding to a physical address from the storage page table, and converts the levels into an estimated error number of the corresponding page through the error index table, so as to complete the estimation operation.

Figure 5:
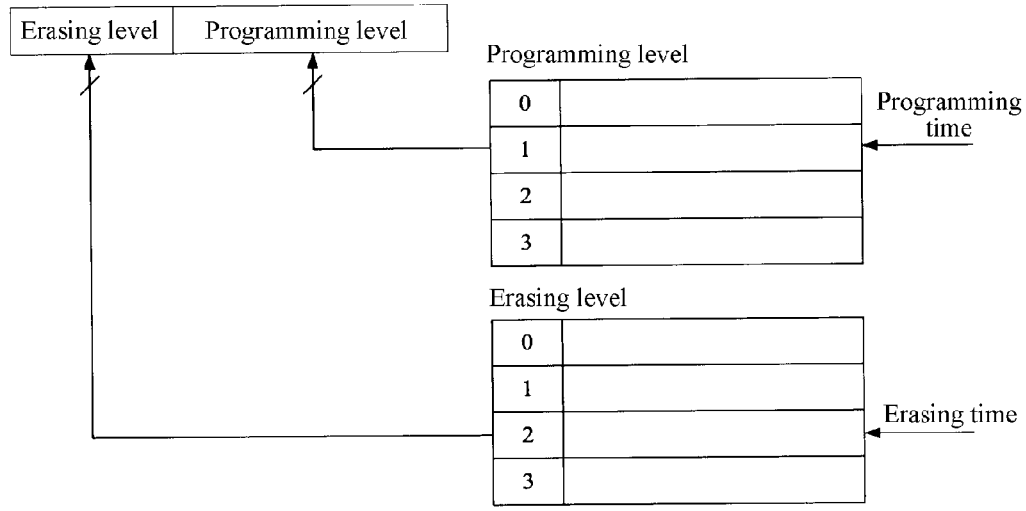
FIG. 5 is an operation time index table.

It is inconvenient to save the programming time or the erasing time collected during the operation. Therefore, the estimation module needs to perform a quantification operation on the programming time and the erasing time, which quantifies a continuous time into a discrete time level, making it easy for the estimation module to index and save the collected data. The quantification process is implemented through a quantification index table, as shown in FIG. 5. The programming time or the erasing time collected by the timer serves as an input for a quantification index. The quantification index records a mapping between a programming level and a programming time and a mapping between an erasing level and an erasing time. The quantification index queries a quantification level corresponding to an input time, thereby performing quantification processing on the time.

Figure 6:
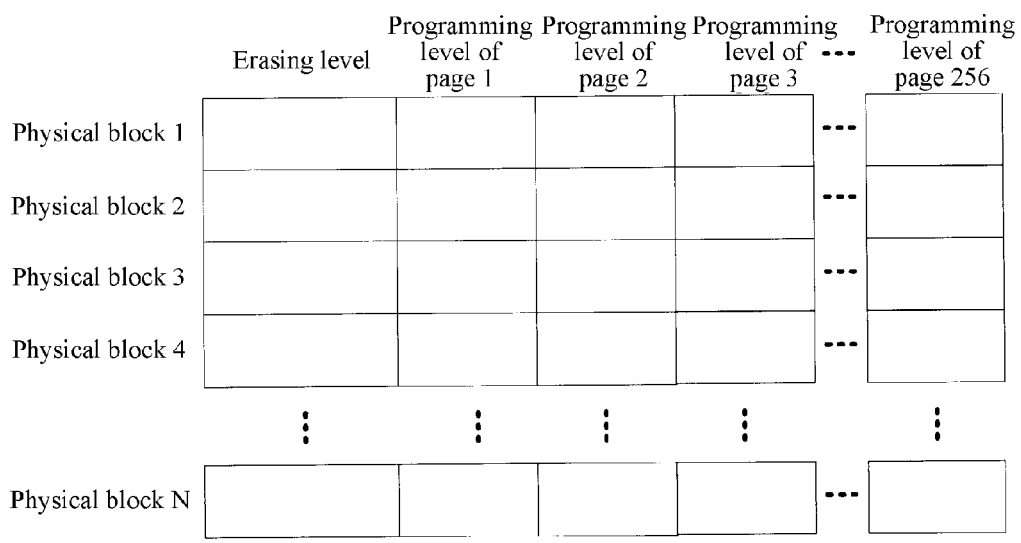
FIG. 6 is an operation time storage structure table.

The quantified programming level and erasing level need to be saved in the manner shown in FIG. 6. An erasing level and a programming level correspond to a physical address. The erasing level represents a service life of a flash memory block corresponding to the physical address. The programming level represents a service life of a page inside the flash memory block. When one block of the flash memory contains 256 pages, the storage page table saves the erasing level of the block at the beginning of the storage unit corresponding to the physical address, and next the storage page table sequentially saves the programming levels of the pages in the storage unit.

Figure 7:
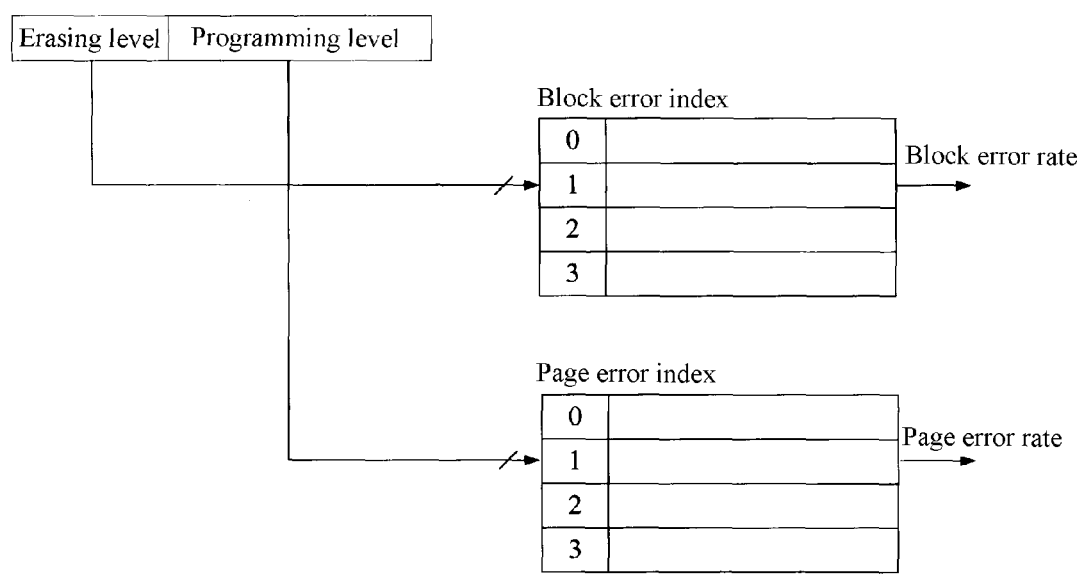
FIG. 7 is an error query index table.

When performing an operation on the flash memory, the flash memory controller requests the estimation module to perform error estimation on the physical address being operated. The estimation module needs to convert the programming level or erasing level of the physical address into an estimated error number of the block or page. The error index table of the estimation module implements the conversion from a time level into an error number, as shown in FIG. 7. The error index table contains two parts: a block error index and a page error index. The block error index converts an erasing level of a block. The page error index converts a programming level of a page. The content in the error index table is completed in advance through an offline test. The flash memory controller acquires an estimated error of a corresponding block or an estimation error of a page according to demands.

Figure 8:
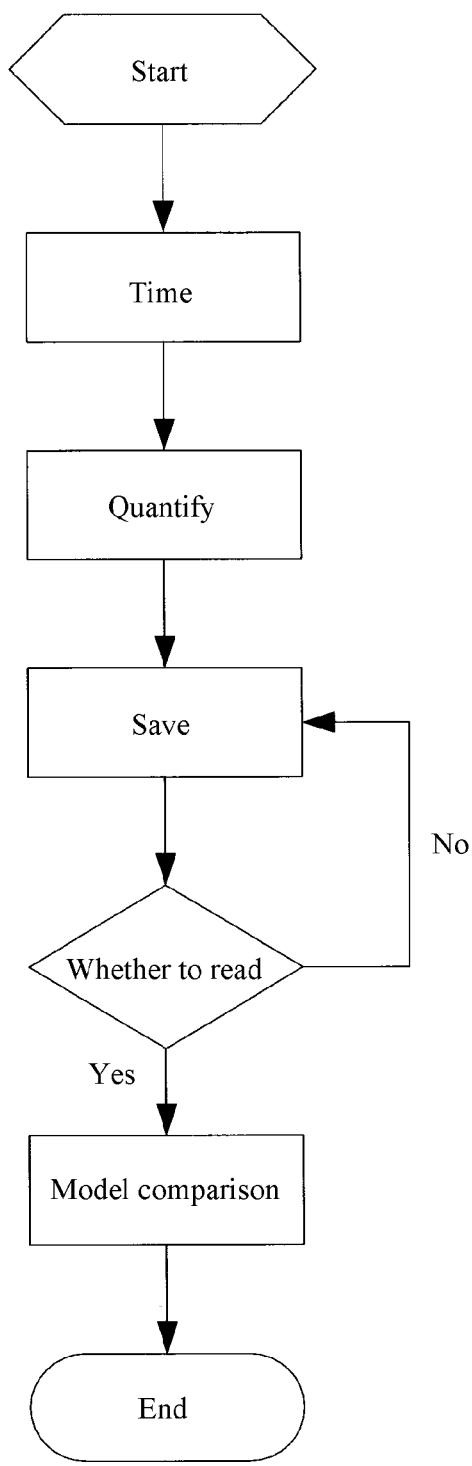
FIG. 8 is a flow chart of an estimation operation.

When performing an operation on the flash memory, the flash memory controller requests the estimation module to perform error estimation on the physical address being operated. The operation process of the estimation operation by the estimation module is shown in FIG. 8. After the estimation module starts working, enter a timing step. During erasing of the flash memory, collect an erasing time of a current flash memory operation block. During programming of the flash memory, collect a programming time of a current flash memory operation page. When the timing is completed, enter a quantification step. The estimation module quantifies the erasing time into an erasing level and quantifies the programming time into a programming level through querying the quantification index table, and saves the current erasing level and programming level and a physical address corresponding to the levels in the storage page table. To perform an error correction operation, the controller reads a programming level and an erasing level corresponding to a physical address from the storage page table, and converts the levels into an estimated error number of the corresponding page through the error index table, so as to complete the estimation operation.

Finally, it should be noted that the above embodiments are merely provided for describing the technical solutions of the present invention, but not intended to limit the technical solutions of the present invention. It should be understood by persons of ordinary skill in the art that although the present invention has been described in detail with reference to the preferred embodiments, modifications or equivalent replacements can be made to the technical solutions of the present invention, as long as such modifications or equivalent replacements do not depart from the scope of the present invention as defined by the appended claims.

What is claimed is:

1. An error estimation device for a flash memory, mainly comprising a timer, a quantification index table, a storage page table, and an error index table, wherein, the timer is used to record a programming time or an erasing time of the flash memory, wherein the programming time or the erasing time collected by the timer serves as an input as a quantification index; the quantification index table is used to record a mapping between a programming level and a programming time and a mapping between an erasing level and an erasing time, wherein the erasing level represents a life state of a flash memory block corresponding to a physical address, and the programming level represents a life state of a page inside the flash memory block; the storage page table comprises several continuous storage units, wherein each continuous storage unit is used to record an erasing level and a programming level of one flash memory block, the erasing level of the flash memory block is saved at the beginning of the continuous storage unit, and the programming levels of pages inside the flash memory block are sequentially saved inside the continuous storage unit; the error index table contains a block error index table and a page error index table, wherein the block error index table records a mapping between an erasing level and a corresponding block error rate, and the page error index table records a mapping between a programming level and a corresponding page error rate; and the error estimation module for a flash memory receives timing information and an enable signal sent by a flash memory controller or an R/B signal sent by a flash memory chip as an input, and outputs an error estimation value to an error check module.

2. An error estimation method for a flash memory of the error estimation device for a flash memory of claim 1, comprising the following specific steps: performing a stress test of erasing and programming operations on a flash memory device, recording experience data of time changes of erasing and programming and errors of the flash memory device; and creating a quantification index table and an error index table as a priori reference tables for error estimation of an estimation module; collecting, by a timer of the estimation module, an erasing time of a current flash memory operation block; and during programming of the flash memory, collecting a programming time of a current flash memory operation page; quantifying, by the estimation module, the erasing time into an erasing level through querying the quantification index table, and quantifying the programming time into a programming level; saving the current erasing level and programming level and a physical address corresponding to the levels in a storage page table; and requesting the estimation module to perform error estimation on a physical address being operated when a flash memory controller performs an operation on the flash memory; reading, by the estimation module, a programming level and an erasing level corresponding to the physical address from the storage page table, and converting the programming level and the erasing level into an estimated error number for a corresponding page through the error index table, thereby completing an estimation operation.

* * * * *